United States Patent [19]

Henry, IV

[11] Patent Number: 4,493,514
[45] Date of Patent: Jan. 15, 1985

[54] MECHANISM FOR PROPORTIONATELY LOADING DUAL THRUST BEARING ASSEMBLIES AGAINST AXIAL THRUST LOADS

[75] Inventor: John W. Henry, IV, Annapolis, Md.

[73] Assignee: The United States of America as represented by the Secretary of the Navy, Washington, D.C.

[21] Appl. No.: 588,182

[22] Filed: Mar. 12, 1984

[51] Int. Cl.³ .................. F16C 19/10; F16C 19/28
[52] U.S. Cl. ....................... 384/613; 384/619
[58] Field of Search ............ 308/227, 219, 230, 233, 308/232, 231, 236, 234

[56] References Cited

U.S. PATENT DOCUMENTS

| | | | |
|---|---|---|---|
| 3,183,048 | 5/1965 | Komor . | |
| 3,454,313 | 7/1969 | Lohneis | 308/189 |
| 3,506,317 | 4/1970 | Angeli | 308/236 |
| 3,516,718 | 6/1970 | Garrison et al. | 308/230 |
| 3,702,719 | 11/1972 | Hoffman . | |
| 3,712,693 | 1/1973 | Root et al. | 308/231 |
| 3,894,818 | 7/1975 | Tschirky | 308/230 |
| 4,017,128 | 4/1977 | Setele | 308/174 |
| 4,252,386 | 2/1981 | Hofmann et al. | 308/177 |
| 4,253,712 | 3/1981 | Rixon | 308/183 |
| 4,325,592 | 4/1982 | Kraus | 308/219 |
| 4,363,608 | 12/1982 | Mulders | 308/227 |
| 4,425,010 | 1/1984 | Bryant et al. | 308/227 |

Primary Examiner—Lenard A. Footland
Attorney, Agent, or Firm—R. F. Beers; L. A. Marsh

[57] ABSTRACT

A mechanism for distributing axial thrust loads acting on a rotating shaft, including dual thrust bearing assemblies concentrically mounted on the rotating shaft for transmitting axial thrust loads to the thrust load distributing mechanism. The thrust load distributing mechanism includes a stationary support member having at least one fulcrum to provide a reaction force to counterbalance the axial thrust loads acting on the rotating shaft, an annular load lever cooperating with each of the at least one fulcrum, at least two thrust transfer members cooperating with first and second segments on the annular load lever and the dual thrust bearing assemblies, and a force transmitting means. In the preferred embodiment two annular load levers are centered on first and second fulcrums, respectively, and each thrust bearing assembly transmits one half the axial thrust loads alternately through, respectively, a first thrust member, or second and third thrust members and the force transmitting means, to first and second segments of the apposite annular load lever such that the axial thrust loads are transmitted to the apposite annular load lever equidistantly with respect to the apposite fulcrum and the reaction force produced in the fulcrum counterbalances the axial thrust load acting on the rotating shaft.

17 Claims, 5 Drawing Figures

MECHANISM FOR PROPORTIONATELY LOADING DUAL THRUST BEARING ASSEMBLIES AGAINST AXIAL THRUST LOADS

BACKGROUND OF THE INVENTION

1. Field of the Invention

This invention relates to thrust bearings, and more particularly to a mechanism for proportionately distributing axial thrust loads between dual thrust bearing assemblies.

2. Description of the Prior Art

Thrust bearing assemblies function to prevent axial displacement of a rotating shaft by transmitting axial thrust loads generated in the shaft from the rotating inner ring of a bearing mounted on the rotating shaft through the bearing rolling elements to an outer ring secured to a stationary support member. For those applications where the shaft is subjected to bidirectional axial thrust loads, duplex rolling element bearings may be utilized to transmit the thrust loads, i.e., rolling element bearings are mounted in pairs such that the first rolling element bearing of each pair prevents axial displacement of the rotating shaft in a first axial direction while the second rolling element bearing of each pair prevents axial displacement of the rotating shaft in the other axial direction. Single-row radial bearings may also be used to support bidirectional axial thrust loads.

Under deep submergence conditions, such as experienced by the seawater pumps of deep diving submarines, the rotating pump shafts of the seawater pumps are subjected to increased axial thrust loads due to the increased hydrostatic pressure of the seawater. Due to the operating requirements of these types of pumps, the thrust bearing unit cooperating with the rotating pump shaft must be capable of transmitting these increased axial thrust loads in either axial direction.

One possible solution for handling the higher axial thrust loads experienced by rotating pump shafts subjected to deep submergence operating conditions is to increase the basic load rating of the rotating pump shaft's thrust bearing unit inasmuch as the basic load rating of a bearing is indicative of the axial thrust load the bearing is capable of handling. The basic load rating of a thrust bearing unit is dependent upon the bearing type, bearing geometry, number of rolling elements, contact angle, accuracy of fabrication and bearing material. The basic load rating of a thrust bearing unit may be increased by increasing the bore diameter of the bearing. Increasing the thrust bearing bore diameter, however, requires that the rotating pump shaft diameter be increased or redesigned to accommodate mounting of the thrust bearing unit. Moreover, increasing the thrust bearing bore diameter reduces the limiting rotational speed at which the bearing life becomes shortened.

Another alternative for increasing the basic load rating of a thrust bearing unit is to utilize a higher thrust bearing unit of a predetermined standard series. Although the bearing unit bore diameter remains constant, the bearing unit outside diameter, width and rolling element size are increased to accommodate the higher axial thrust loads. This larger thrust bearing unit results in increased weight, space and cost parameters which are negative considerations due to the space and weight constraints imposed in the design of pumps for deep diving submarines. Furthermore, thrust bearing units of a large size suitable for use in pumps in deep diving submarines are either not domestically manufactured or have not been acoustically qualified, i.e., rated to ensure that the maximum decibel level produced by the thrust bearing unit is less than or equal to a predetermined acceptable level.

SUMMARY OF THE INVENTION

Accordingly, to overcome the deficiencies of thrust bearing units as noted hereinabove, a primary object of the present invention is to provide a mechanism cooperating with a thrust bearing unit to double the axial thrust load capability of a given rotating shaft without substantially increasing the overall dimensions of the pump.

Another object of the present invention is to provide a mechanism for proportionately distributing bidirectional axial thrust loads acting on a rotating shaft between dual thrust bearing assemblies.

Still another object of the present invention is to provide a mechanism for equally distributing bidirectional axial thrust loads acting on a rotating shaft between dual thrust bearing assemblies.

Yet another object of the present invention is to provide a mechanism which permits the utilization of existing, qualified thrust bearings under conditions where the rotating shaft is subjected to high axial thrust loads.

Yet a further object of the present invention is to provide a mechanism cooperating with the thrust bearing assemblies of a rotating shaft which permits the designing of simple, inexpensive, compact single-stage overhung pumps.

Summarily, these and other objects of the present invention are attained by the use of a mechanism for proportionately distributing bidirectional axial thrust loads acting on a rotating shaft between dual thrust bearing assemblies, each thrust bearing assembly having a basic load rating C such that it is capable of transmitting a bidirectional axial thrust load F, concentrically mounted on the rotating shaft such that the dual thrust bearing assemblies act in tandem so that the rotating shaft has a capability of being subjected to bidirectional axial thrust loads of 2F. Each thrust bearing assembly is configured such that it is responsive to axial thrust loads acting on the rotating shaft in either axial direction. The first thrust bearing assembly is rigidly affixed to a first thrust transfer member which cooperates with a first annular load lever and a second annular load lever. The second thrust bearing assembly is rigidly affixed to a second thrust transfer member which cooperates with the first annular load lever. A thrust transfer means cooperates with the second thrust transfer member to transmit axial thrust loads to a third thrust transfer member. The third thrust transfer member cooperates with the second annular load lever. The first and second annular load levers are supported by first and second fulcrums, respectively, projecting from a stationary support member. In the preferred embodiment, the first and second annular load levers are supported at their midpoints by the first and second fulcrums, respectively. The first and second thrust transfer members cooperate with the first annular load lever equidistantly from the first fulcrum in opposed directions, and similarly, the first and third thrust transfer members cooperate with the second annular load lever equidistantly from the second fulcrum in opposed directions.

When an axial thrust load F acts upon the rotating shaft, each thrust bearing assembly transmits a loading force of F/2 to the apposite annular load lever inasmuch as the lever-fulcrum principle ensures that each thrust bearing assembly is subjected to the same axial thrust load when the lever is centered on the fulcrum. Since the system is in static equilibrium, the stationary support member is subjected to a reaction force of magnitude F directed through the apposite fulcrum which counterbalances the axial thrust load F acting on the rotating shaft.

BRIEF DESCRIPTION OF THE DRAWINGS

A more complete understanding of the present invention and the attendant advantages and features thereof will be more readily appreciated as the same becomes better understood by reference to the following detailed description when considered in conjunction with the accompanying drawings wherein.

DESCRIPTION OF THE PREFERRED EMBODIMENTS

Figure 1:
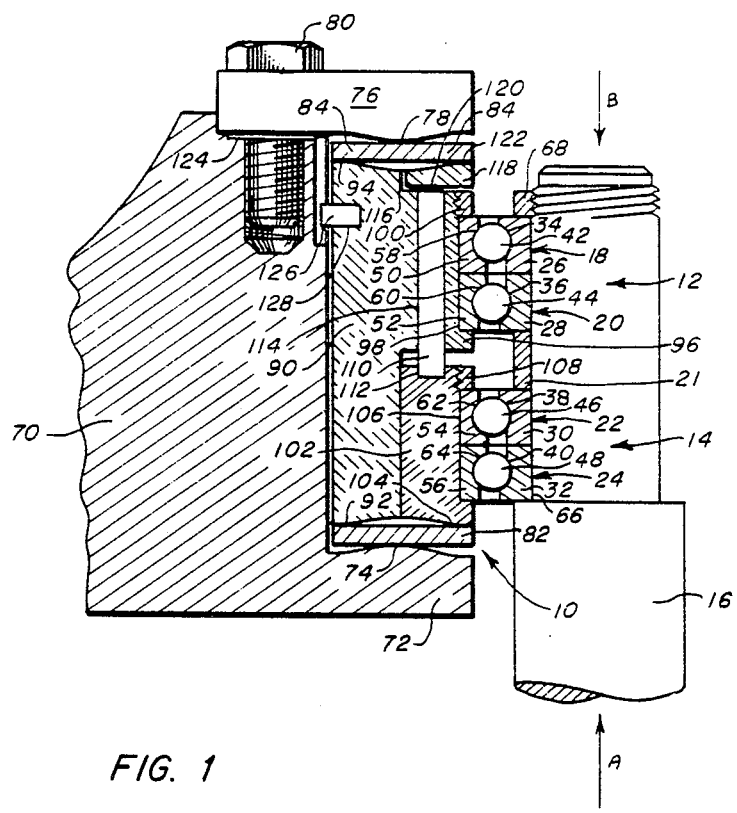
FIG. 1 is a partial sectional view of a first embodiment of the present invention showing a thrust load distributing mechanism in cooperation with dual thrust bearing assemblies mounted on a rotating shaft subjected to bidirectional axial thrust loads.

Referring now to the drawings, wherein like reference numerals designate corresponding elements throughout the several views, there is shown generally in FIG. 1 a mechanism 10 for proportionately distributing bidirectional axial thrust loads acting on a rotating shaft 16 between dual thrust bearing assemblies 12, 14. The rotating shaft 16 is an element of a pump system (not shown) of types known in the prior art which may be subjected to high bidirectional axial thrust loads due to the operating conditions and environment of the pump system. An example of such a pump type is the seawater pump of a deep diving submarine.

Figure 2:
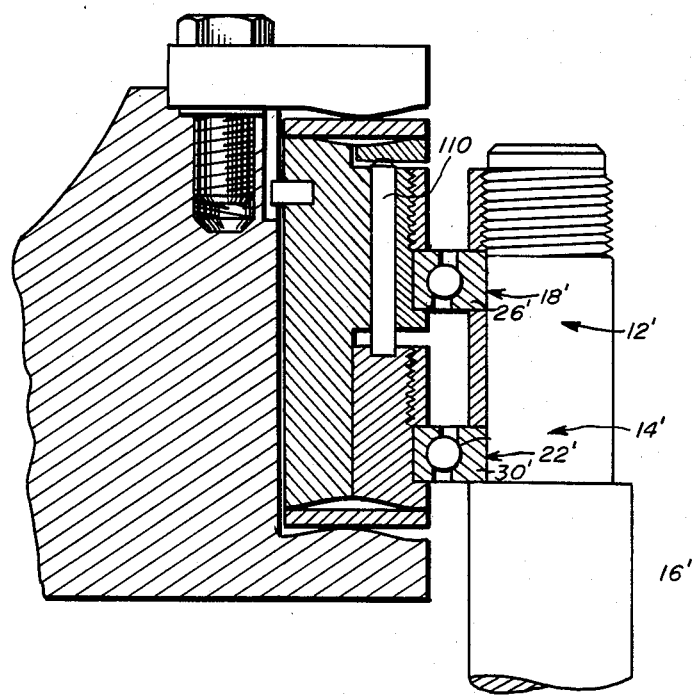
FIG. 2 is a partial sectional view of a second embodiment of the present invention showing the thrust load distributing mechanism in cooperation with dual thrust bearing assemblies mounted on a rotating shaft subjected to bidirectional axial thrust loads.

As shown in the first embodiment of the present invention as depicted in FIG. 1, each thrust bearing assembly 12, 14 is a duplex bearing, i.e., thrust bearing assembly 12 comprises individual bearings 18, 20 disposed as a back-to-back pair and thrust bearing assembly 14 comprises individual bearings 22, 24 disposed as a back-to-back pair. This back-to-back arrangement of the individual bearings 18, 20 and 22, 24 ensures that each thrust bearing assembly 12, 14 is responsive to axial thrust loads in either axial direction. For an axial thrust load in the direction of arrow A, individual bearings 20, 24 function as the axial thrust load transmitters. For an axial thrust load in the direction indicated by arrow B, individual bearings 18, 22 function as the axial thrust load transmitters. The individual bearings 18, 20, 22, 24 are conventional bearings of types well known in the prior art and are comprised of inner rings 26, 28, 30, 32, inner-ring rolling-element raceways 34, 36, 38, 40, a plurality of rolling elements 42, 44, 46, 48, outer rings 50, 52, 54, 56 and outer-ring rolling-element raceways 58, 60, 62, 64, respectively. Cages (not shown) are used to separate the rolling elements of the individual bearings. In the preferred embodiment described herein the individual bearings 18, 20, 22, 24 are angular-contact bearings utilizing balls as the rolling elements 42, 44, 46, 48. Angular-contact bearings are designed to support combined radial and thrust loads or heavy thrust loads depending on the magnitude of the contact angle. Angular-contact bearings having large contact angles can support heavier thrust loads. It is to be understood that the scope of the present invention is not to be limited to angular-contact bearings. Tapered-roller bearings, in which the rolling elements are configured as frustums of right circular cones, may be used as the rolling elements 42, 44, 46, 48 in the individual bearings 18, 20, 22, 24 of the thrust bearing assemblies 12, 14, for heavy radial and thrust loads. Furthermore, the thrust bearing assemblies 12, 14 are not limited to duplex bearing assemblies as shown in FIG. 1. FIG. 2 shows a second embodiment of the present invention wherein each thrust bearing assembly 12', 14' is comprised of a single individual bearing 18', 22' of the deep groove single-row radial type. Single-row radial bearings can support both radial and thrust loads. The thrust bearing assemblies 12, 14 of FIG. 1 are concentrically mounted on the shaft 16 by rigidly securing the inner rings 26, 28, 30, 32 of the individual bearings 18, 20, 22, 24, respectively, on the periphery of the shaft 10 in an end-to-end relationship. As shown in FIG. 1, the inner rings 26, 28, 30, 32 are concentrically disposed on a shaft shoulder 66 formed in the shaft 16 and secured thereto by means of an annular locknut 68 in threaded engagement with the shaft 16. Other conventional means for mounting thrust bearing assemblies may be used and still be within the scope of the present invention. An annular spacing means 21 maintains an axial separation between thrust bearing assembly 12 and thrust bearing assembly 14.

Figure 3:
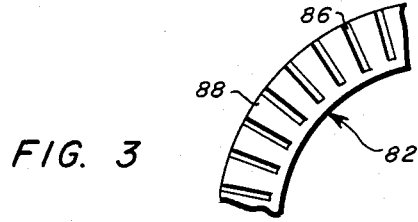
FIG. 3 is a partial plan view of an annular load lever.

The thrust load distributing mechanism 10 consists of a generally C shaped stationary support member 70 which provides a reaction force which counterbalances the bidirectional axial thrust loads acting on the rotating shaft 16. Stationary support member 70 is generally annular in shape and is concentrically disposed about the shaft 16. One of the support legs 72 of the support member 70 is integral therewith while the other support leg 76 is detachably secured to the support member 70 by means of securing bolts 80. Annular fulcrums 74, 78 project from the support legs 72, 76, respectively, and in the first embodiment are disposed such that the annular load levers 82, 84 described hereinbelow are supported at their respective midpoints. Annular load levers 82, 84, having outer diameters approximately equal to the lengths of the support legs 72, 76, respectively, are disposed on the annular fulcrums 74, 78, respectively. As shown in FIG. 3, annular load lever 82 is configured as a segmented ring, having a plurality of slots 86 formed in the outer edge of the annular load lever 82 such that a plurality of segmented levers 88 are defined thereon. Annular load lever 84 is similarly configured. The segmented ring structure permits axial flexure of the annular load levers 82, 84 when they are subjected to the axial thrust loads transmitted from the rotating shaft 16. A first annular thrust transfer member 90 is generally L shaped and of such dimensions that it is disposed between support legs 72, 76 in concentric relationship with the shaft 16. The first thrust transfer member 90 has surfaces 92, 94 at respective ends thereof which contact first segments of the first and second annular load levers, 82, 84, respectively. A projecting portion 96 of the first thrust transfer member 90 has a shoulder 98 for stationarily mounting the outer rings 50, 52 of the individual bearings 18, 20 of the first thrust bearing assembly 12 thereto. The first thrust bearing assembly 12 is rigidly secured to the first thrust transfer member 90 by means of an annular locking nut 100 engaging a threaded portion of the shoulder 98 of the projecting portion 96. A second annular thrust transfer member 102 is axially aligned with the projecting portion 96 such that it is in sliding contact with the first thrust transfer member 90 and is concentrically disposed about the rotating shaft 16. The second thrust transfer member 102 has a surface 104 at a first end thereof which contacts a second segment of the first annular load lever 82. In the first embodiment shown in FIG. 1, the surfaces 92 and 104 are so disposed that they contact the first and second segments, respectively, of the first annular load lever 82 equidistantly in opposed directions with respect to the first fulcrum 74. A shoulder 106 is formed in the second thrust transfer member 102 for stationarily mounting the outer rings 54, 56 of the individual bearings 22, 24 of the second thrust bearing assembly 14 thereto. The second thrust bearing assembly 14 is rigidly secured to the second thrust transfer member 102 by means of an annular locking nut 108 engaging a threaded portion of the shoulder 106. A plurality of thrust transfer pins 110 have first ends thereof mounted in a plurality of recesses 112 formed in a second end of the second thrust transfer member 102. The thrust transfer pins 110 are slidingly disposed in a plurality of bores 114 formed in the projecting portion 96 of the first thrust transfer member 90. A third thrust transfer member 118 is disposed in a cutout segment 116 formed in the projecting portion 96 of the first thrust transfer member 90 axially distal from the second thrust transfer member 102. The third thrust transfer member 118 is axially aligned with the projecting portion 96 and is concentrically disposed about the shaft 16. Second ends of the thrust transfer pins 110 are mounted in a plurality of recesses 120 formed in the third thrust transfer member 118. The lengths of the thrust transfer pins 110 are such that the second and third thrust transfer members 102, 118 are maintained in an axially spaced apart relationship with respect to the projecting portion 96 of the first thrust transfer member 90. This geometric spacing ensures that axial thrust loads transmitted to the first thrust transfer member 90 are not transmitted to the second and third thrust transfer members 102, 118 and vice versa. The third thrust transfer member 118 has a surface 122 at one end thereof which contacts a second segment of the second annular load lever 84. In the first embodiment shown in FIG. 1, the surfaces 94 and 122 are disposed so that they contact the first and second segments, respectively, of the second annular load lever 84 equidistantly in opposed directions with respect to the fulcrum 78.

Shims 124 may be used in cooperation with the securing bolts 80, the detachable support leg 76, and the stationary support member 70 to remove any end play, or to provide a small preload, on the mechanism 10. A key 126 integrally formed on the stationary support member 70 is keyed to a slot 128 formed in the first thrust transfer member 90 to preclude rotation of the first, second and third thrust transfer members 90, 102, 118. Relative motion of the elements of the mechanism 10 is very small and is due to end play or deflection in the first and second thrust bearing assemblies 12, 14.

Figure 4:
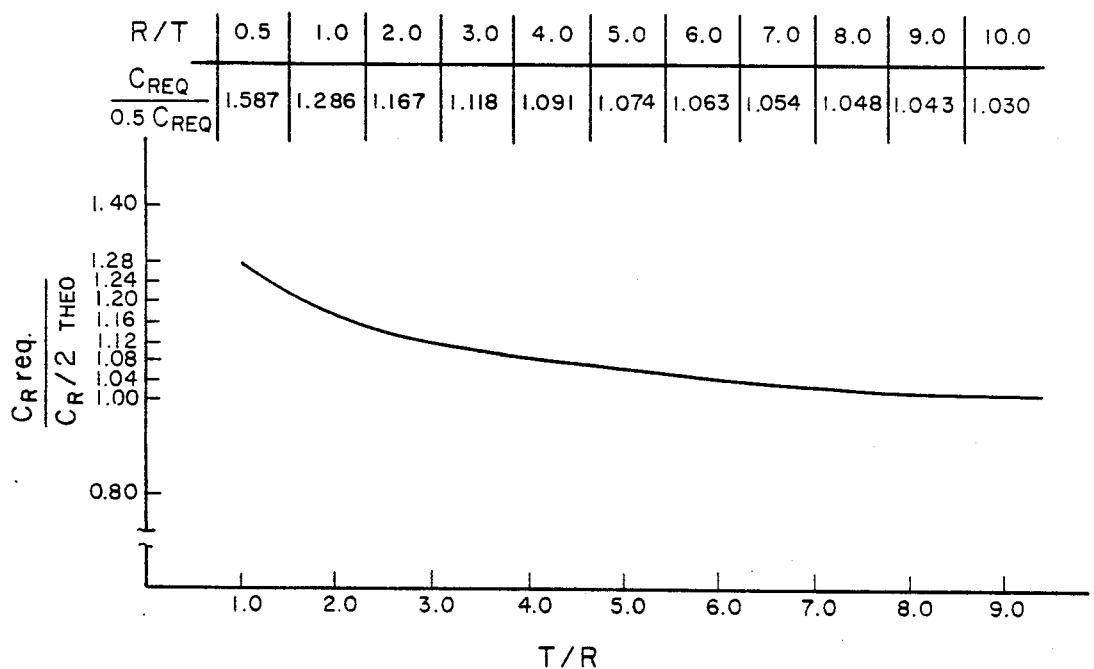
FIG. 4 is a graph showing the ratio of the basic load rating of the dual thrust bearing assemblies to one half the basic load rating of the thrust bearing unit versus the ratio of thrust loading to radial loading.

Based upon given design constraints for a deep submergence pump for a deep diving submarine, maximum thrust loading, maximum radial loading, pump design life and pump shaft rotational speed will be known parameters which are used to compute the basic load rating Cr required for the thrust bearing unit. Once the basic load rating Cr required for the thrust bearing unit has been computed, the basic load rating Cr(12, 14) required for each of the thrust bearing assemblies 12, 14 may be ascertained by referring to the graph of FIG. 4. The abscissa of FIG. 4 is the ratio of maximum thrust loading to maximum radial loading and the ordinate is the ratio of Cr(12,14) to 0.5 times the computed design basic load rating Cr for the thrust bearing unit. As will be noted from an inspection of FIG. 4, the basic load ratings Cr(12,14) required for the thrust bearing assemblies 12, 14 are slightly greater than one half of the computed design basic load rating Cr for the thrust bearing unit. This results from the fact that, although each thrust bearing assembly 12, 14 is subjected to one half of the axial thrust loading, each thrust bearing assembly 12, 14 may be subjected to the full radial loading. Thus, the thrust load distributing mechanism 10 of the present invention allows the design of a deep submergence pump which uses off-the-shelf thrust bearing assemblies 12, 14 which are domestically produced and acoustically qualified and wherein the thrust bearing assemblies 12, 14 function in tandem to double the axial thrust load capability of the rotating shaft 16, i.e., the axial thrust load capability of each thrust bearing assembly 12, 14 is additive.

In operation an axial thrust load F in the direction of arrow B of FIG. 1 acting on the rotating shaft 16 is transmitted by bearings 18, 22 of the first and second thrust bearing assemblies 12, 14 to the first and second thrust transfer members 90, 102, respectively. In the first embodiment where the first annular load level 82 is centered on the first fulcrum 74 and the surfaces 92 and 104 are equidistantly spaced in opposed directions with respect to the first fulcrum 74, equal loading forces F/2 are transmitted to the first annular load lever 82. The loading force F/2 transmitted to the first thrust transfer member 90 is transmitted to the first segment of the first annular load lever 82 through surface 92 and the loading force F/2 transmitted to the second thrust transfer member 102 is transmitted to the second segment of the first annular load lever 82 through surface 104. Since the loading forces F/2 are transmitted to the first annular load lever 82 equidistantly in opposed directions with respect to the first fulcrum 74, and since the thrust distributing mechanism 10 is in static equilibrium, the lever-fulcrum principle causes a reaction force F in the fulcrum 74 of the stationary support member 70 which counterbalances the axial thrust load F acting on the rotating shaft 16. An axial thrust load F in the direction of arrow A acting on the rotating shaft 16 is transmitted by bearings 20, 24 of the thrust bearing assemblies 12, 14 to the first and second thrust transfer members 90, 102, respectively, as equal loading forces F/2. The loading force F/2 acting on the first thrust transfer member 90 is transmitted to the first segment of the annular load lever 84 through surface 94, and the loading force F/2 acting on the second thrust transfer member 102 is transmitted through the thrust transfer pins 110 to the third thrust transfer member 118. The surface 122 of the third thrust transfer member 118 transmits the loading force F/2 to the second segment of the second annular load lever 84. Since in the first embodiment shown in FIG. 1 the second annular load lever 84 is disposed equally about the fulcrum 78, and the surfaces 94 and 122 are equidistantly spaced in opposed directions about the fulcrum 78, the lever-fulcrum principle causes a a reaction force F in the fulcrum 78 of the stationary support member 70 which counterbalances the axial thrust load F acting on the rotating shaft 16.

Figure 5:
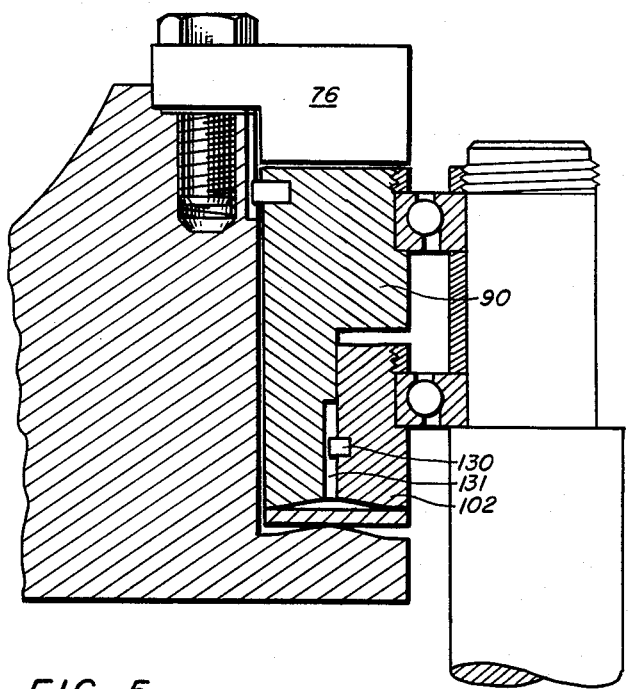
FIG. 5 is a partial section view of a third embodiment of the present invention showing a thrust load distributing mechanism in cooperation with dual thrust bearing assemblies mounted on a rotating shaft subjected to unidirectional axial thrust loads.

Thus, the present invention as described hereinabove provides a mechanism for proportionately distributing, and in the first embodiment for equally distributing, bidirectional axial thrust loads between dual thrust bearing assemblies such that the rotating shaft of a pump may sustain axial thrust loads greater than the thrust load capability of the individual thrust bearing assemblies. Other modifications of the present invention are possible. By adjusting the positioning of the first and second fulcrums with respect to the first and second annular load levers, the bidirectional axial thrust loads may be proportionately distributed between the dual thrust bearing assemblies rather than equally. For rotating pump shafts subjected to axial thrust loads in only one direction, the embodiment shown in FIG. 5 may be used. The structure of the support leg 76 and the first annular thrust transfer member 90 are modified as shown. In this embodiment, the third thrust transfer member 118, the annular load lever 84, and the thrust transfer pins 110 are eliminated. Single rather than duplex thrust bearing assemblies would normally be used for unidirectional thrust loads. A key 130 engages a keyway 131 to prevent rotation of the second thrust transfer member 102 with respect to the firsts thrust transfer member 101, this function being performed by the thrust transfer pins 110 of the first embodiment. This axial thrust load distributing mechanism functions in a manner similar to the first embodiment described hereinabove.

Obviously, numerous modifications and variations of the present invention are possible in light of the above teachings. It is therefore to be understood that within the scope of the appended claims, the present invention may be practiced otherwise than as specifically described hereinabove.

What is claimed as new and desired to be secured by Letters Patent of the United States is:

1. A mechanism for proportionately distributing bidirectional axial thrust loads acting on a rotating shaft, comprising:
   a first thrust bearing assembly concentrically mounted on said rotating shaft and adapted to transmit a first portion of said bidirectional axial thrust loads acting on said rotating shaft;
   a second thrust bearing assembly concentrically mounted on said rotating shaft and adapted to transmit a second portion of said bidirectional axial thrust loads acting on said rotating shaft;
   a stationary support member disposed proximal said rotating shaft, said stationary support member further comprising first and second fulcrums;
   a first annular load lever concentrically disposed about said rotating shaft and cooperating with said first fulcrum to alternately transmit said bidirectional axial thrust loads thereto;
   a second annular load lever concentrically disposed about said rotating shaft and cooperating with said second fulcrum to alternately transmit said bidirectional axial thrust loads thereto;
   a first thrust transfer member concentrically disposed about said rotating shaft and adapted to cooperate with said first thrust bearing assembly, a first segment of said first annular load lever and a first segment of said second annular load lever such that said first portion of said bidirectional axial thrust loads transmitted by said first thrust bearing assembly is alternately transmitted by said first thrust transfer member to said first segment of said first annular load lever and said first segment of said second annular load lever;
   a second thrust transfer member concentrically disposed about said rotating shaft and adapted to cooperate with said second thrust bearing assembly and a second segment of said first annular load lever such that said second portion of said bidirectional axial thrust loads acting in a first axial direction transmitted by said second thrust bearing assembly is alternately transmitted by said second thrust transfer member to said second segment of said second annular load lever;
   force transmitting means for transmitting said second portion of said bidirectional axial thrust loads in a second axial direction alternately transmitted to said second thrust transfer member by said second thrust bearing assembly; and
   a third thrust transfer member concentrically disposed about said rotating shaft and adapted to cooperate with said force transmitting means and a second segment of said second annular load lever such that said second portion of said bidirectional axial thrust loads in said second axial direction is alternately transmitted by said force transmitting means to said second segment of said second segment of said second annular load lever by said third thrust transfer member,
   whereby when said rotating shaft is subjected to said bidirectional axial thrust loads in said first axial direction said first portion of said bidirectional axial thrust loads is transmitted to said first segment of said first annular load lever and said second portion of said bidirectional axial thrust loads is transmitted to said second segment of said first annular load lever to cause a first reaction force in said first fulcrum of said stationary support member equal in magnitude and in an opposed direction to said bidirectional axial thrust loads in said first direction and when said rotating shaft is subjected to said bidirectional axial thrust loads in said second direction said first portion of said bidirectional axial thrust loads is transmitted to said first segment of said second annular load lever and said second portion of said bidirectional axial thrust loads is transmitted to said second segment of said second annular load lever to cause a second reaction force in said second fulcrum of said stationary support member equal in magnitude and in an opposed direction to said bidirectional axial thrust loads in said second direction.

2. The bidirectional axial thrust loads distributing mechanism as claimed in claim 1, wherein said first annular load lever is centered on said first fulcrum and said second annular load lever is centered on said second fulcrum, and further wherein said first and second segments of said first annular load lever are disposed equidistantly in opposed directions about said first fulcrum and said first and second segments of said second annular load lever are disposed equidistantly in opposed directions about said second fulcrum such that said first portion of said bidirectional axial thrust loads transmitted by said first thrust bearing assembly equals said second portion of said bidirectional axial thrust loads transmitted by said second thrust bearing assembly and further wherein said first portion of said bidirectional axial thrust loads equals one half of said bidirectional axial thrust loads acting on said rotating shaft.

3. The bidirectional axial thrust loads distributing mechanism as claimed in claim 1, wherein said first thrust transfer member further includes a plurality of bores, each of said plurality of bores having an axis parallel to said rotating shaft, a first end proximal said second thrust transfer member and a second end proximal said third thrust transfer member, and wherein said force transmitting means further comprises a plurality of thrust transmitting pins disposed in said bores, each of said plurality of said thrust transmitting pins having a first end cooperating with said second thrust transfer member and a second end cooperating with said third thrust transfer member such that said plurality of thrust transmitting pins alternately transmits said second portion of said bidirectional axial thrust loads in said second axial direction from said second thrust transfer member to said third thrust transfer member.

4. The bidirectional axial thrust loads distributing mechanism as claimed in claim 3, wherein each of said plurality of thrust transmitting pins has a predetermined length such that said plurality of thrust transmitting pins maintains said second thrust transfer member in a spaced apart relationship from said first thrust transfer member and said third thrust transfer member in a spaced apart relationship from said first thrust transfer member.

5. The bidirectional axial thrust loads distributing mechanism as claimed in claim 1, wherein said first thrust bearing assembly further comprises a first pair of bearings disposed back-to-back with respect to said rotating shaft, a first bearing of said first pair of bearings adapted to transmit said first portion of said bidirectional axial thrust loads in said first axial direction and a second bearing of said first pair of bearings adapted to transmit said first portion of said bidirectional axial thrust loads in said second axial direction, and wherein said second thrust bearing assembly further comprises a second pair of bearings disposed back-to-back with respect to said rotating shaft, a first bearing of said second pair of bearings adapted to transmit said second portion of said bidirectional axial thrust loads in said first axial direction and a second bearing of said second pair of bearings adapted to transmit said second portion of said bidirectional axial thrust loads in said second axial direction.

6. The bidirectional axial thrust loads distributing mechanism as claimed in claim 5, wherein said first pair of bearings further comprises angular-contact bearings and said second pair of bearings further comprises angular-contact bearings.

7. The bidirectional axial thrust loads distributing mechanism as claimed in claim 5, wherein said first pair of bearings further comprises tapered-roller bearings and said second pair of bearings further comprises tapered-roller bearings.

8. The bidirectional axial thrust loads distributing mechanism as claimed in claim 1, wherein said first thrust bearing assembly further comprises a first bearing, said first bearing adapted to alternately transmit said first portion of said bidirectional axial thrust loads in said first axial direction and said first portion of said bidirectional axial thrust loads in said second axial direction, and wherein said second thrust bearing assembly further comprises a second bearing, said second bearing adapted to alternately transmit said second portion of said bidirectional axial thrust loads in said first axial direction and said second portion of said bidirectional axial thrust loads in said second axial direction.

9. The bidirectional axial thrust loads distributing mechanism as claimed in claim 8, wherein said first bearing further comprises a single-row radial bearing, and wherein said second bearing further comprises a single-row radial bearing.

10. The bidirectional axial thrust loads distributing mechanism as claimed in claim 1, wherein said first annular load lever further includes a plurality of slots formed in an outer edge thereof to define a plurality of lever segments, and wherein said second annular load lever further includes a plurality of slots formed in an outer edge thereof to define a plurality of lever segments such that said bidirectional axial thrust loads alternately transmitted to said first annular load lever and said second annular load lever causes flexure of said plurality of lever segments of said first annular load lever and said plurality of lever segments of said second annular load lever.

11. The bidirectional axial thrust loads distributing mechanism as claimed in claim 1, wherein said stationary support member further comprises a key integral therewith and adapted to cooperate with said first thrust transfer member to maintain said first thrust transfer member rotationally stationary with respect to said stationary support member.

12. A mechanism for proportionately distributing axial thrust loads in a first axial direction acting on a rotating shaft, comprising:
a first thrust bearing assembly concentrically mounted on said rotating shaft and adapted to transmit a first portion of said axial thrust loads in said first axial direction acting on said rotating shaft;
a second thrust bearing assembly concentrically mounted on said rotating shaft and adapted to transmit a second portion of said axial thrust loads in said first axial direction acting on said rotating shaft;
a stationary support member disposed proximal said rotating shaft, said stationary support member further comprising a fulcrum;
an annular load lever concentrically disposed about said rotating shaft and cooperating with said fulcrum to transmit said axial thrust loads in said first axial direction thereto;
a first thrust transfer member concentrically disposed about said rotating shaft and adapted to cooperate with said first thrust bearing assembly and a first segment of said annular load lever such that said first portion of said axial thrust loads in said first axial direction transmitted by said first thrust bearing assembly is transmitted by said first thrust transfer member to said first segment of said annular load lever;
a second thrust transfer member concentrically disposed about said rotating shaft and adapted to cooperate with said second thrust bearing assembly and a second segment of said annular load lever such that said second portion of said axial thrust loads in said first direction transmitted by said second thrust bearing assembly is transmitted by said second thrust transfer member to said second segment of said annular load lever; and separating means adapted to cooperate with said first and second thrust transfer members for maintaining a spaced apart relationship therebetween, whereby when said rotating shaft is subjected to said axial thrust loads in said first axial direction said first portion of said axial thrust loads is transmitted to said first segment of said annular load lever and said second portion of said axial thrust loads is transmitted to said second segment of said annular load lever to cause a reaction force in said fulcrum of said stationary support member equal in magnitude and in an opposed direction to said axial thrust loads in said first axial direction.

13. The axial thrust loads distributing mechanism as claimed in claim 12, wherein said annular load lever is centered on said fulcrum, and further wherein said first and second segments of said annular load lever are disposed equidistantly in opposed directions about said fulcrum such that said first portion of said axial thrust loads equals said second portion of said axial thrust loads and further wherein said first portion of said axial thrust loads equals one half of said axial thrust loads acting on said rotating shaft.

14. The axial thrust loads distributing mechanism as claimed in claim 12, wherein said first thrust bearing assembly further comprises an angular-contact bearing and wherein said second thrust bearing assembly further comprises an angular-contact bearing.

15. The axial thrust loads distributing mechanism as claimed in claim 12, wherein said first thrust bearing assembly further comprises a tapered-roller bearing and wherein said second thrust bearing assembly further comprises a tapered-roller bearing.

16. The axial thrust loads distributing mechanism as claimed in claim 12, wherein said first thrust bearing assembly further comprises a single-row radial bearing and wherein said second thrust bearing assembly further comprises a single-row radial bearing.

17. The axial thrust loads distributing mechanism as claimed in claim 12, wherein said annular load lever further includes a plurality of slots formed in an outer edge thereof to define a plurality of lever segments such that said axial thrust loads transmitted to said annular load lever cause flexure of said plurality of lever segments.

* * * * *